US008220057B2

(12) United States Patent
Clerc

(10) Patent No.: US 8,220,057 B2
(45) Date of Patent: Jul. 10, 2012

(54) METHOD FOR THE AUTOMATIC CONTROL OF FRAUD IN AN ELECTRONIC TRANSACTION SYSTEM

(75) Inventor: Fabrice Clerc, Blainville sur Orne (FR)

(73) Assignee: France Telecom, Paris (FR)

( * ) Notice: Subject to any disclaimer, the term of this patent is extended or adjusted under 35 U.S.C. 154(b) by 1390 days.

(21) Appl. No.: 10/578,755

(22) PCT Filed: Oct. 22, 2004

(86) PCT No.: PCT/FR2004/002734
§ 371 (c)(1),
(2), (4) Date: May 8, 2006

(87) PCT Pub. No.: WO2005/048523
PCT Pub. Date: May 26, 2005

(65) Prior Publication Data
US 2007/0136210 A1 Jun. 14, 2007

(30) Foreign Application Priority Data

Nov. 6, 2003 (FR) ...................................... 03 13034

(51) Int. Cl.
*H04L 29/06* (2006.01)
(52) U.S. Cl. ................ 726/26; 726/27; 726/28; 726/29; 726/30; 726/22; 713/182; 705/75; 705/64; 705/50; 709/217; 709/218; 709/219
(58) Field of Classification Search ........................ None
See application file for complete search history.

(56) References Cited

U.S. PATENT DOCUMENTS

| | | | |
|---|---|---|---|
| 5,845,267 A | | 12/1998 | Ronen |
| 6,154,731 A * | | 11/2000 | Monks et al. ................ 705/36 R |
| 6,442,512 B1 * | | 8/2002 | Sengupta et al. ................. 703/6 |
| 6,567,814 B1 * | | 5/2003 | Bankier et al. ........................ 1/1 |
| 6,636,613 B1 | | 10/2003 | Schwenk et al. |
| 6,675,164 B2 * | | 1/2004 | Kamath et al. ........................ 1/1 |
| 7,181,729 B2 * | | 2/2007 | Grundy et al. ................. 717/128 |
| 8,108,245 B1 * | | 1/2012 | Hosea et al. ................. 705/7.33 |
| 2002/0002445 A1 * | | 1/2002 | Doliov ............................. 703/2 |

(Continued)

FOREIGN PATENT DOCUMENTS

DE 197 50 779 C 1/1999

OTHER PUBLICATIONS

Fiat et al., "Dynamic Traitor Tracing", Journal of Cryptology, Springer Verlag, New York, NY, vol. 14, No. 3, pp. 211-223, Jun. 2001.

(Continued)

*Primary Examiner* — Syed A. Zia
(74) *Attorney, Agent, or Firm* — Cozen O'Connor

(57) ABSTRACT

A method of automatically controlling fraud in an electronic transaction system. When a user initiates a session in the electronic transaction system, an element is generated and stored in a database in association with information identifying the user. Each time during the session the user commands the execution of an operation, an equation is determined that is satisfied by the element stored in the database. When a sufficient given number of operations has been effected, the system of equations consisting of the equations determined as above is solved to deduce the element. By consulting the database, the corresponding information identifying the user is deduced from the element obtained in this way.

10 Claims, 3 Drawing Sheets

U.S. PATENT DOCUMENTS

| | | | |
|---|---|---|---|
| 2002/0162016 A1* | 10/2002 | Colvin | 713/200 |
| 2002/0194159 A1* | 12/2002 | Kamath et al. | 707/2 |
| 2004/0167859 A1* | 8/2004 | Mirabella | 705/59 |
| 2004/0220878 A1* | 11/2004 | Lao et al. | 705/51 |
| 2005/0160049 A1* | 7/2005 | Lundholm | 705/59 |
| 2006/0073890 A1* | 4/2006 | McAllister et al. | 463/29 |
| 2006/0112130 A1* | 5/2006 | Lowson | 707/102 |
| 2008/0120251 A1* | 5/2008 | Tyagi et al. | 705/36 R |
| 2010/0023453 A1* | 1/2010 | Keresman et al. | 705/41 |
| 2011/0112962 A1* | 5/2011 | Winslow et al. | 705/39 |

OTHER PUBLICATIONS

Boneh et al., "An efficient public key traitor tracing scheme", Advances in Cryptology, Crypto 99, 19$^{th}$ annual International Cryptology Conference, Santa Barbara, CA, pp. 340-346, Aug. 15-19, 1999.

* cited by examiner

METHOD FOR THE AUTOMATIC CONTROL OF FRAUD IN AN ELECTRONIC TRANSACTION SYSTEM

RELATED APPLICATION

This is a U.S. National Phase Application under 35 USC 371 of International Application PCT/FR2004/002734, filed Oct. 22, 2004.

FIELD OF THE INVENTION

The invention relates to online services on the Internet or any other information network.

BACKGROUND OF THE INVENTION

Online services generally employ protocols intended to preserve the confidentiality of the electronic transactions carried out. In particular, online services guarantee the anonymity of users through the use of session keys. When a user connects to a service, the user is assigned a session key. That key is used to encrypt the information exchanged between the user and the service provider system.

Some online service systems include means for revealing the session key in the event of fraudulent use of the service. Revealing the session key leads to revealing the identity of the dishonest user and consequently removes the anonymity of that user.

User anonymity removal means necessarily employ detection means adapted to command the removal of anonymity if certain conditions in respect of fraudulent use are satisfied. Such means must therefore be able to determine whether there has been fraudulent use or not.

SUMMARY OF THE INVENTION

An object of the invention is to provide an anonymity removal system in the context of an online service that does not require any means for determining fraudulent use.

The invention applies in the situation of fraudulent use consisting in obtaining a service a number of times in the same session exceeding the number authorized for a session. This is the situation, for example, of a user who connects to a site for downloading files and succeeds in downloading several files although paying to download only one file.

The invention applies in particular to the illicit duplication of electronic goods.

One aspect of the present invention is directed to a method of automatically controlling fraud in an electronic transaction system. When a user initiates a session in the electronic transaction system, an element is generated and stored in a database in association with information identifying the user. Each time during the session the user commands the execution of an operation, an equation is determined that is satisfied by the element stored in the database. When a sufficient given number of operations has been effected, the system of equations consisting of the equations determined as above is solved to deduce the element. By consulting the database, the corresponding information identifying the user is deduced from the element obtained in this way.

In the context of the invention, a session is defined as a period of time during which a user is connected to a given online service and is authorized by the service provider to carry out a certain number of given operations.

The method of the invention leads to revealing the identity of a user if the user has carried out some given number n of operations during the same session that is not authorized by the service provider.

The method of the invention is applied automatically and identically to all users of a given service. There is therefore no distinction between fraudulent users and ordinary users. Thus the method of the invention does not use dedicated means in the event of fraudulent use.

Moreover, with the method of the invention, the identity of the user is disclosed only if the user has carried out in the same session a given number n of operations that is greater than the number of operations authorized for a session. Consequently, before the user carries out the $n^{th}$ operation, the method gives no indication as to the identity of the user, since it supplies a certain number of equations and there is an infinite number of solutions to those equations. As a result the method of the invention preserves the anonymity of users completely, provided that they comply with limits set by the service provider.

The equations of the system of equations are preferably independent. A user will therefore be systematically identified on carrying out a known number n of operations, the number n corresponding to the number of operations needed to obtain a system of n equations having a single solution.

The equations may be linear equations. The element consists of a series of numerical coefficients, for example.

Those numerical coefficients may advantageously define a geometrical object in an n-dimensional space, such as a point, a line, a hyperplane, etc.

They may equally define a mathematical object such as a function, a series, etc.

Another aspect of the invention is directed to a system for automatically controlling fraud in an electronic transaction system. A first calculation means generates an element when a user initiates a session in the electronic transaction system. A database is provided in which the element is stored in association with information identifying the user. The first calculation means is adapted to determine an equation that the element stored in the database satisfies each time the user commands the execution of an operation in the session. A second calculation means is adapted to solve the system of equations consisting of the equations determined as above to deduce the element therefrom when a sufficient given number of operations has been effected, so that, by consulting the database, it is possible to deduce from the element obtained in this way the corresponding information identifying the user.

Another aspect of the invention is directed to a non-transitory computer-readable storage medium encoded with a computer program executed by a computer that causes automatic control of fraud in an electronic transaction system in accordance with the methods described herein.

BRIEF DESCRIPTION OF THE DRAWINGS

Other features and advantages emerge from the following description, which is purely illustrative, is not limiting on the invention, and should be read with reference to the appended drawings, in which:

Referring to FIG. 1, the fraud control system 100 is associated with server 200 for an online service (for example a service for downloading files or programs, for online purchases, for consulting documents, a communications service, etc.) operated by a service provider. The fraud control system includes a control module 102 connected to the server 200, a database 104 connected to the control module 102, a pseudorandom generator 106, a first calculation module 108, and a second calculation module 110. The control module 102 controls the pseudorandom generator 106, the first calculation module 108, and the second calculation module 110.

Figure 1:
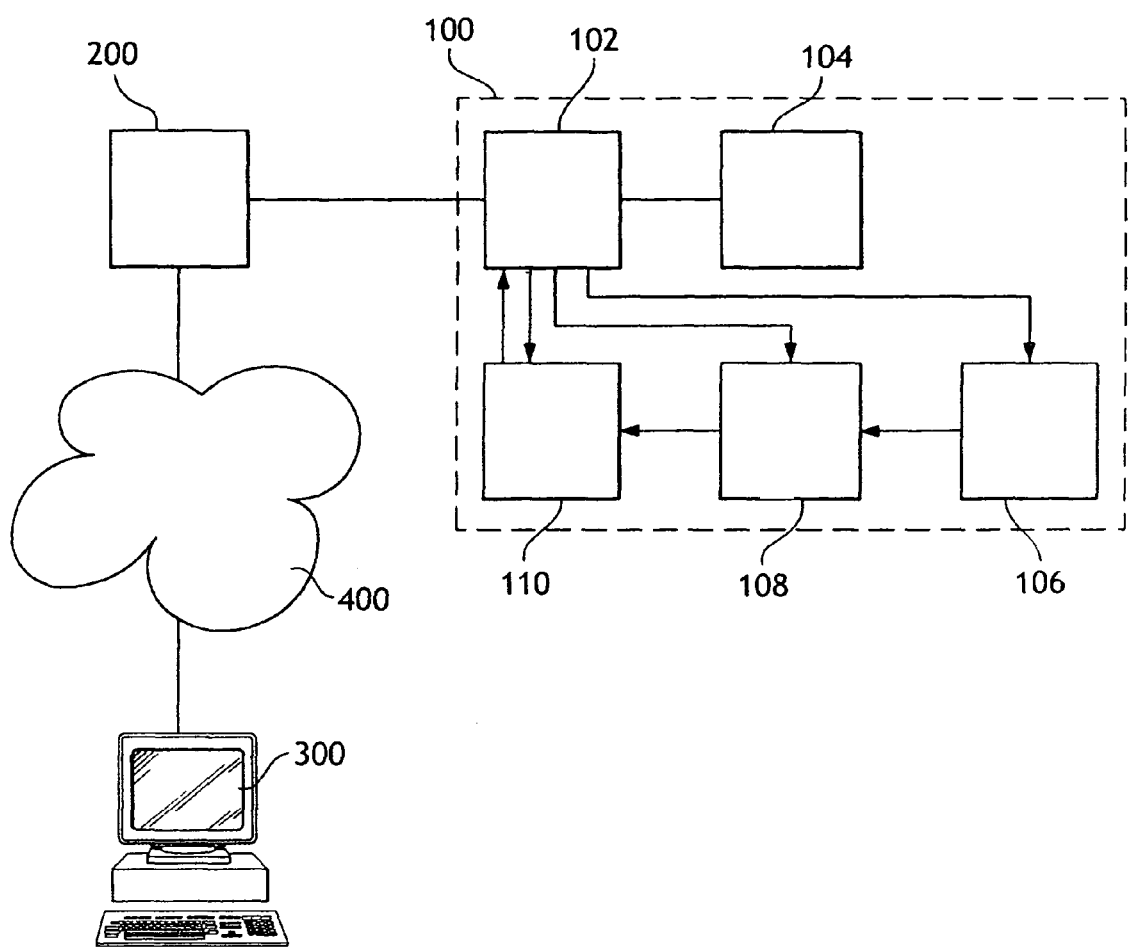
FIG. 1 shows one example of a system of the invention.

In a first embodiment of the system of the invention, when a user 300 connects to the server 200 of the service provider via a communications network 400 and opens a session, a temporary session key is automatically assigned to the user by the server. The session key is stored in the database 104. It is normally held in the database 104 throughout the session, and then deleted when the session is closed. It enables communications between the user 300 and the server 200 to be made secure. The keys and other information contained in the database 104 are confidential.

When the user 300 opens a session, the first calculation module 108 generates an equation of a line (having one dimension) in a space having two dimensions, this equation being of the type $$Y = aX + b$$

The equation of the line is stored in the database 104 associated with the session key assigned to the user. The user and the session are therefore associated in a one-to-one relationship with the line D defined by the pair of coefficients (a, b).

When the user commands the execution of a particular operation in the context of the session that has been opened (for example the downloading of a file or a program), the first calculation module 108 determines the coordinates $(X_1, Y_1)$ of a point $P_1$ on the line D. To this end, the control module commands the pseudorandom generator 106 to generate a first coordinate $X_1$. Using that coordinate $X_1$, the first calculation module 108 determines a second coordinate $Y_1$ from the equation of the line D, as follows:

$$Y_1 = aX_1 + b$$

On its own, this first point $P_1(X_1, Y_1)$ is insufficient to determine the equation of the line D. At this stage it is not possible to work back to the identity of the user 300.

If the user 300 succeeds in illicitly commanding the execution of another operation during the same session, the first calculation module 108 determines the coordinates $(X_2, Y_2)$ of a second point $P_2$ on the line D. To this end, the control module 102 commands the pseudorandom generator 106 to generate a first coordinate $X_2$ different from $X_1$. Using that coordinate $X_2$ the first calculation module 108 determines a second coordinate $Y_2$ from the equation of the line D, as follows:

$$Y_2 = aX_2 + b$$

Figure 2:
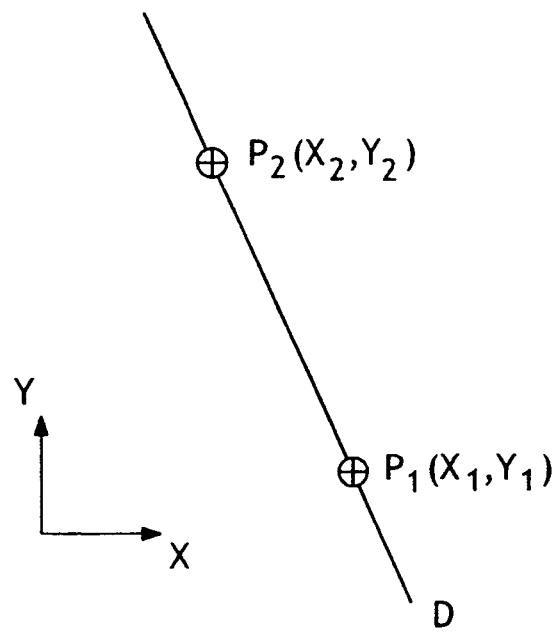
FIG. 2 is a graphical representation of the determination of an element associated with a user, the element being a line defined in a two-dimensional space.

As shown in FIG. 2, the second calculation module 110 deduces the equation of the line D from the two points $P_1(X_1, Y_1)$ and $P_2(X_2, Y_2)$ determined as above. To this end, the second module solves the following system of equations:

$$\begin{cases} Y_1 = aX_1 + b \\ Y_2 = aX_2 + b \end{cases}$$

Knowing the equation of the line D (i.e. the coefficients a and b) supplied by the second calculation module 110, the control module 102 deduces the associated session key by consulting the database 104. That key identifies the fraudulent user who has succeeded in carrying out two operations although authorized to carry out only one operation.

Once the confidentiality as to the identity of the user 300 has been removed, various steps may then be carried out. For example, the service provider may bar access to the server 200 by the user 300.

In the embodiment of the invention described above, the space in which lines are created is a space having two dimensions. This implementation may be generalized to an application in a space having n dimensions.

The first calculation module 108 generates an equation of a hyperplane H (having n−1 dimensions) in a space. E having n dimensions, the equation being of the type $$X_n = a_{n-1}X_{n-1} + \ldots + a_2X_2 + a_1X_1 + a_0$$

in which at least a number (n−2) of the coefficients $a_{n-1}, \ldots, a_2, a_1, a_0$ are zero. The session key and the associated equation of the hyperplane H are stored in the database 104. Thus the user and the session are associated with the hyperplane H defined by the n coefficients $(a_{n-1}, \ldots, a_2, a_1, a_0)$.

Each time the user commands the execution of an $i^{th}$ operation in the same session, the first calculation module 108 determines a point $P_i$ with coordinates $$X_i^1, X_i^2, \ldots X_i^n)$$

in the hyperplane H. To this end, the control module 102 commands the pseudorandom generator 106 to generate a set of (n−1) coordinates $$X_i^1, X_i^2, \ldots X_i^{n-1})$$

Using that set of coordinates, the first calculation module 108 determines an $n^{th}$ coordinate $$X_i^n$$

from the equation of the hyperplane H, as follows:

$$X_i^n = a_{n-1}X_i^{n-1} + \ldots a_2X_i^2 + a_1X_i^1 + a_0$$

If the user 300 has commanded the execution of an operation for the $n^{th}$ time in the same session, the second calculation module 110 deduces the equation of the hyperplane H from the n points $P_1, P_2, \ldots P_n$ calculated by the first calculation module 108. To this end, it solves the following system of equations:

$$\begin{cases} X_1^n = a_{n-1}X_1^{n-1} + \ldots a_2X_1^2 + a_1X_1^1 + a_0 \\ X_2^n = a_{n-1}X_2^{n-1} + \ldots a_2X_2^2 + a_1X_2^1 + a_0 \\ \ldots \\ X_n^n = a_{n-1}X_n^{n-1} + \ldots a_2X_n^2 + a_1X_n^1 + a_0 \end{cases}$$

Knowing the equation of the hyperplane H (i.e. the coefficients $a_{n-1}, \ldots, a_2, a_1, a_0$), it is possible, by consulting the database 104, to deduce the session key associated with the hyperplane H and consequently to work back to the identity of the fraudulent user. This key identifies the fraudulent user who has succeeded in carrying out n operations although authorized to carry out only n−1 operations.

Figure 3:
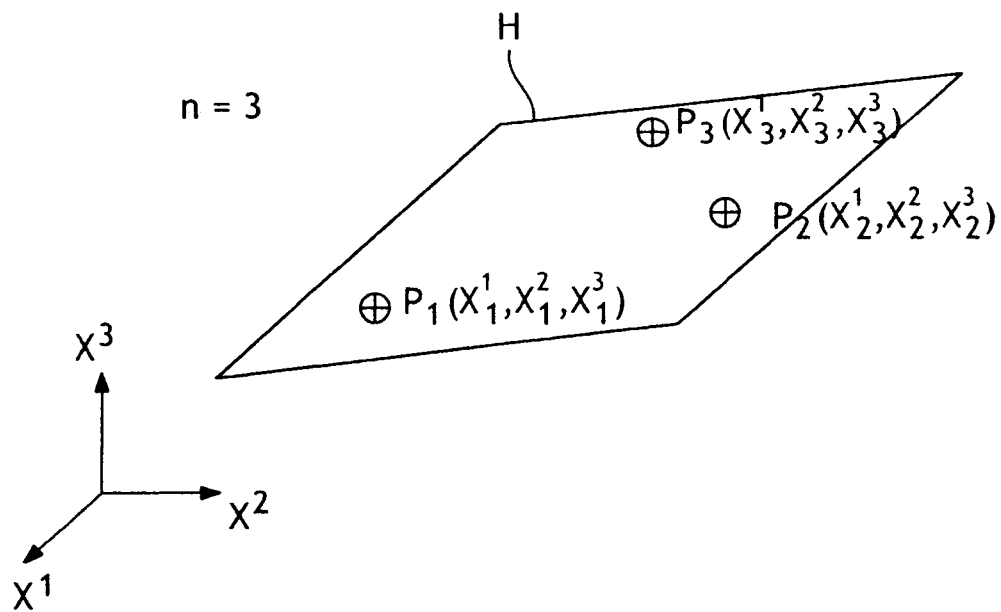
FIG. 3 is a graphical representation of the determination of an element associated with a user, the element being a plane defined in a space having n=3 dimensions.

FIG. 3 represents the determination of a plane H (having two dimensions) in a space having n=3 dimensions from three points $P_1, P_2,$ and $P_3$ calculated by the first calculation module 108.

In a second embodiment of the fraud control system, when a user 300 connects to the server 200 of the service provider via a communications network 400 and opens a session, a temporary session key is automatically assigned to the user 300 by the server 200.

The first calculation module 108 generates a point P (having 0 dimensions) in a space having two dimensions, the point being defined by coordinates of the type (X, Y). The session key and the coordinates of the associated point P are stored in the database.

When the user commands the execution of an operation, the first calculation module determines an equation $Y=a_1X+b_1$ of a line $D_1$ passing through the point P(X, Y). To this end, the control module commands the pseudorandom generator to generate a first coefficient a, corresponding to the slope of the line $D_1$. Using this first coefficient $a_1$, the first calculation module determines a second coefficient $b_1$ corresponding to the ordinate at the origin of the line $D_1$ from the coordinates (X, Y), as follows: $Y=a_1X+b_1$. Thus:

$$b_1 = Y - a_1 \cdot X$$

This first line equation $Y=a_1X+b_1$ does not enable determination of the coordinates of the point P(X, Y) and working back to the identity of the user.

Figure 4:
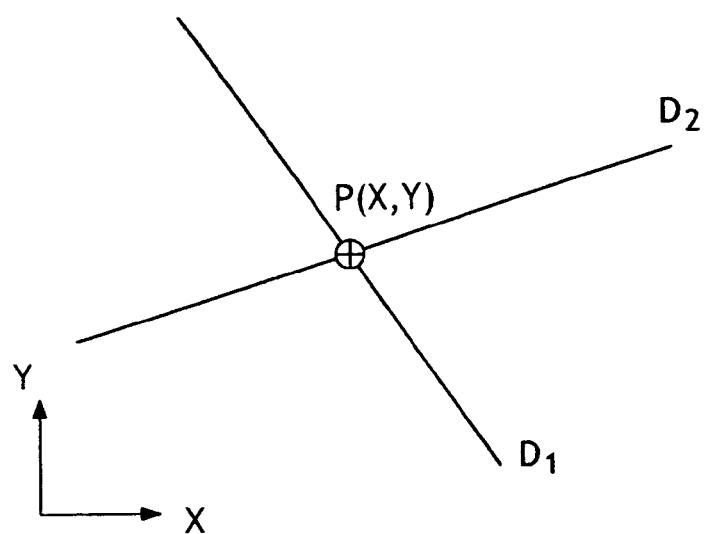
FIG. 4 is a graphical representation of the determination of an element associated with a user, the element being a point defined in a two-dimensional space.

As shown in FIG. 4, if the user illicitly commands the execution of the same operation, the first module determines an equation $Y=a_2X+b_2$ of a second line D2 passing through the point (X, Y). To this end, the control module commands the pseudorandom generator to generate a first coefficient $a_2$ different from $a_1$. Using this first coefficient $a_2$, the first calculation module determines a second coefficient $b_2$ from the coordinates (X, Y) of the point, as follows:

$$b_2 = Y - a_2 \cdot X$$

In this embodiment of the invention, the space in which the points are created has two dimensions. This implementation may be generalized to an application in a space having n dimensions.

When the user commands the execution of a particular operation in the context of the session that has been opened, for example the downloading of a file or a program, the first calculation module 108 generates a point P (having 0 dimensions) in a space having n dimensions. The session key and the point P associated with that key are stored in the database 104. Thus the user and the session are associated with a point P defined by the n coordinates $(X_1, X_2, \ldots X_n)$.

Each time the user commands the execution of an $i^{th}$ operation in the same session, the first calculation module 108 determines a hyperplane $H_i$ containing the point $P(X_1, X_2, \ldots X_n)$, the hyperplane $H_i$ being defined by an equation of the type $$X^n = a_{n-1}^i X^{n-1} + \ldots a_2^i X^2 + a_1^i X^1 + a_0^i$$

in which at least (n−2) of the coefficients $$a_{n-1}^i, \ldots a_2^i, a_1^i, a_0^i$$

are zero. To this end, the control module commands the pseudorandom generator 106 to generate a set of (n−1) coefficients $$a_1^i, a_2^1, \ldots, a_{n-1}^1)$$

Using those (n−1) coefficients, the first calculation module 108 determines an nth coefficient $$a_0^i$$

from the coordinates of the point $P(X_0, X_1, X_2, \ldots X_n)$, as follows:

$$X_n = a_{n-1}^i X_{n-1} + \ldots a_2^i X^2 + a_1^i X^1 + a_0^i$$

The anonymity of the user 300 is maintained if the user carries out at most (n−1) operations, as the system generates (n−1) equations with n unknowns, those n unknowns being the coordinates $(X_1, X_2, \ldots X_n)$ of the point P.

If the user 300 executes n operations in the same session, the second calculation module 110 deduces the coordinates of the point $P(X_1, X_2, \ldots X_n)$ as being the intersection of the n hyperplanes $H_1, H_2, \ldots H_n$ calculated by the first calculation module 108. To this end, the second calculation module 110 solves a system of n equations in n unknowns:

$$\begin{cases} X_n = a_{n-1}^1 X_{n-1} + \ldots a_2^1 X_2 + a_1^1 X_1 + a_0^1 \\ X_n = a_{n-1}^2 X_{n-1} + \ldots a_2^2 X_2 + a_1^2 X_1 + a_0^2 \\ \ldots \\ X_n = a_{n-1}^n X_{n-1} + \ldots a_2^n X_2 + a_1^n X_1 + a_0^n \end{cases}$$

Knowing the coordinates of the point $P(X_1, X_2, \ldots X_n)$ is it is possible, by consulting the database 104, to deduce the session key associated with that point P and consequently to work back to the identity of the fraudulent user.

Figure 5:
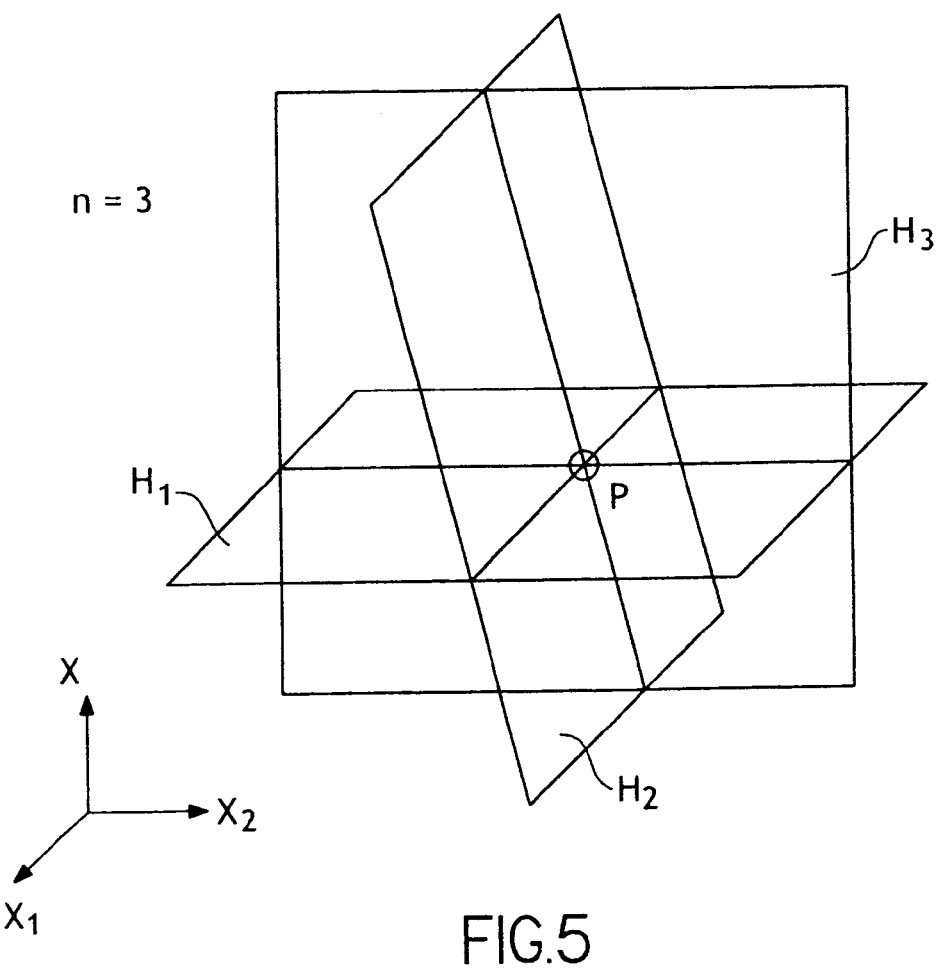
FIG. 5 is a graphical representation of the determination of an element associated with a user, the element being a point defined in a space having n=3 dimensions.

FIG. 5 represents the determination of the point P in a space having n=3 dimensions from three planes $H_1$, $H_2$, and $H_3$ (having two dimensions) calculated by the first calculation module 108.

The invention claimed is:

1. A method of automatically controlling fraud in an electronic transaction system, comprising the steps of:
   generating an element and storing the generated element in a database in association with information identifying a session initiated by a user when the user initiates the session in the electronic transaction system;
   each time during the session that the user commands the execution of an operation, determining an equation that is satisfied by the element stored in the database;
   solving a system of independent equations comprising the determined equations to obtain an element therefrom when a number of the determined equations is greater than a number of authorized operations, the obtained element being equal to the generated element stored in the database; and
   deducing from the obtained element, by consulting the database, the associated information identifying the user that initiated the session.

2. The method according to claim 1, wherein the independent equations are linear equations.

3. The method according to claim 1, wherein the element comprises a series of numerical coefficients.

4. The method according to claim 3, wherein the series of numerical coefficients defines an equation of a hyperplane having (n−1) dimensions in a space having n dimensions and, when the user commands the execution of the operation, the step of determining the equation comprises determining coordinates $(X_i^1, X_i^2, \ldots X_i^n)$ of a point in the hyperplane having (n−1) dimensions in the space having n dimensions.

5. The method according to claim 4, wherein the series of numerical coefficients defines an equation of a line in a space having two dimensions and, when the user commands the execution of the operation, the step of determining the equation comprises determining coordinates $(X_i, Y_i)$ which belong to the line.

6. The method according to claim 3, wherein the series of numerical coefficients defines coordinates $(X_1, X_2, \ldots X_n)$ of a point in a space having n dimensions and, when the user commands the execution of the operation, the step of determining the equation comprises determining the equation of a hyperplane containing the point in the space having n dimensions.

7. The method according to claim 6, wherein the series of numerical coefficients defines coordinates $(X_1, X_2)$ of a point in a space having two dimensions and, when the user commands the execution of the operation, the step of determining the equation further comprises determining an equation of a line $(D_i)$ passing through the point in the space having two dimensions.

8. A system for automatically controlling fraud in an electronic transaction system, comprising:
   first calculation means for generating an element when a user initiates a session in the electronic transaction system;
   a database in which the generated element is stored in association with information identifying the session initiated by a user, the first calculation means being configured to define, each time that the user commands execution of an operation during the session, an equation that is satisfied by the element stored in the database;
   second calculation means configured to solve a system of independent equations comprising the equations defined by the first calculation means to obtain an element therefrom when a number of the defined equations is greater than a number of authorized operations, the obtained element being equal to the generated element stored in the database, so that, by consulting the database, it is possible to deduce from the obtained element the associated information which identifies the user that initiated the session; and
   a control module comprising a processor and memory and being configured to connect to a server of the electronic transaction system to receive the generated element and store the generated element in the database.

9. A non-transitory computer-readable storage medium encoded with a computer program which, when executed by a computer in an electronic transaction system, causes the computer program to execute a method comprising:
   generating an element and storing the generated element in a database in association with information identifying a session initiated by a user when the user initiates the session in the electronic transaction system;
   defining, each time during the session that the user commands execution of an operation, an equation that is satisfied by the element stored in the database;
   solving a system of independent equations comprising the defined equations to obtain an element therefrom when a number of the defined equations is greater than a number of authorized operations, the obtained element being equal to the generated element stored in the database; and
   deducing from the obtained element, by consulting the database, the associated information identifying the user that initiated the session.

10. The method according to claim 1, wherein the element is dependent on the number of authorized operations for the user during the session.

* * * * *